Jan. 11, 1949.   H. G. TAYLOR   2,458,805
APPARATUS FOR MEASURING ELECTRICAL RESISTANCE
Filed Oct. 19, 1945

INVENTOR
HENRY GEORGE TAYLOR
BY
ATTORNEY.

Patented Jan. 11, 1949

2,458,805

UNITED STATES PATENT OFFICE 2,458,805

APPARATUS FOR MEASURING ELECTRICAL RESISTANCE

Henry George Taylor, London, England, assignor to The Hartford National Bank & Trust Company, Hartford, Conn., as trustee Application October 19, 1945, Serial No. 623,269
In Great Britain September 1, 1944

Section 1, Public Law 690, August 8, 1946
Patent expires September 1, 1964

7 Claims. (Cl. 175—183)

This invention relates to apparatus for measuring electrical resistance, more particularly the earth resistance in electrical installations.

When electrical apparatus is protected against earth faults by overload devices such as fuses, circuit-breakers, etc. it is essential that the resistance in the path of the fault current should be sufficiently low to enable an adequate current to pass to operate the gear. With the increasing size of electrical installations it is becoming of greater importance to take adequate precautions to ensure that this resistance is particularly low. The circuit involves the impedance of the transformer winding, the "live" conductor from the transformer to the equipment, the earth continuity conductor from the frame of the equipment to the service point, the earth electrode (if used) at the consumer's premises and the earth electrode at the substation. In urban areas it is customary to earth to the lead sheath of the supply cable and in this case a metallic path is provided from consumer's premises back to the substation.

It is quite common to find apparatus fitted with 60 amp. fuses and these require a total resistance of not more than 2 ohms if they are to blow in less than one minute. Since, however, I. E. E. regulations permit the resistance of the earth continuity conductor itself to be as high as 1 ohm it will be clear that there is only 1 ohm left for the remainder of the circuit. If any larger size of fuse is employed, and this is frequently the case with industrial equipment, then obviously the very greatest care has to be taken to ensure an adequately low fault path resistance.

This has been a matter of considerable concern for some time in view of the fire risk involved by high earth-fault currents which just fail to clear the circuit. Provided that the earth resistance is sufficiently low, an earth fault will cause the operation of the overload device, thereby eliminating the risk of persistent high earth-fault currents.

The object of the present invention is to provide an instrument whereby a resistance such as the earth resistance in an electrical installation can be determined simply and quickly.

The apparatus according to the present invention comprises an ammeter or equivalent current responsive device having two ranges in which for a given deflection on the ammeter the currents bear a fixed ratio, two resistances having the inverse ratio to said fixed ratio, terminals adapted to be connected by way of a source of current to the opposite ends of the resistance to be measured, and switch means enabling either the smaller resistance to be connected between the terminals with the ammeter in the less sensitive range setting to measure the current passing through the smaller resistance, or the larger resistance together with a further adjustable resistance to be connected in series between the terminals with the ammeter in the more sensitive range setting to measure the current passing through the larger resistance.

Reference will now be had to the accompanying drawings, wherein.

Figure 1:
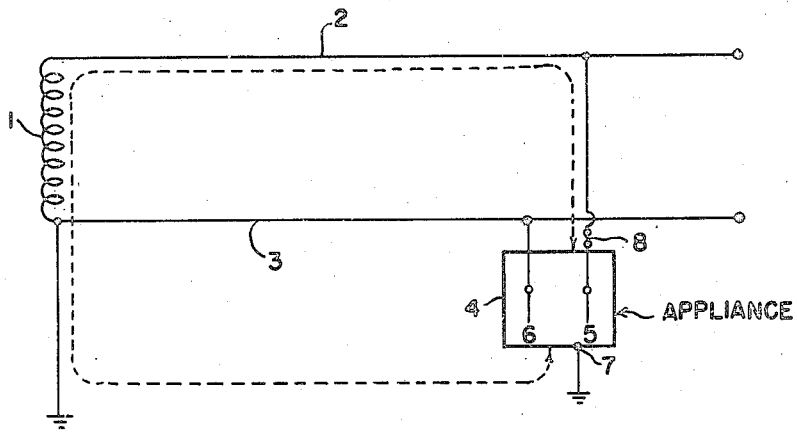
Fig. 1 shows diagrammatically the circuit in which the earth resistance occurs in an electrical installation

Referring first to Fig. 1, a sub-station 1 supplies current to the consumer by way of the conductors 2, 3, the conductor 2 being the "live" conductor and 3 the "neutral conductor." The sub-station end of the neutral conductor is earthed. At the consumer's premises the terminals 5, 6 of an appliance 4 are connected to the conductors 2, 3, respectively, the housing of the appliance being connected to earth at 7. A fuse 8 is included in the "live" lead. The unknown earth resistance (X ohms) occurs in the circuit shown by the broken line including the sub-station transformer winding, the "live" conductor and the earth connections at the sub-station and at the consumer's premises.

Figure 2:
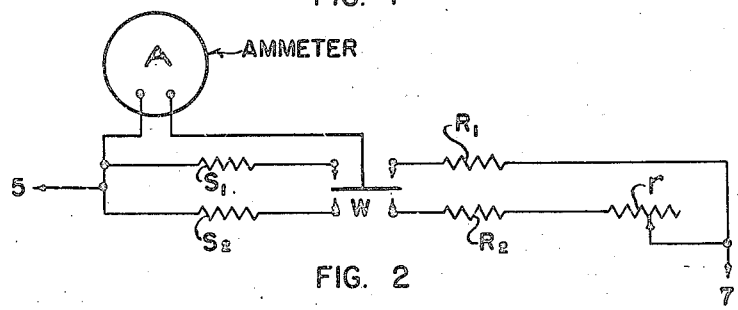
Fig. 2 shows diagrammatically the circuit arrangement of one embodiment of the present invention.

Fig. 2 shows diagrammatically the circuit arrangement of one embodiment of resistance measuring instrument of the present invention. This instrument, which is connected between the live terminal 5 of the appliance and the housing of the appliance, comprises an ammeter A provided with shunts $S_1$ and $S_2$, a switch W adapted to connect the shunts $S_1$ and $S_2$ alternatively and simultaneously to connect in series with the shunted ammeter either a fixed resistance $R_1$ or the series connection of a fixed resistance $R_2$ and a variable resistance $r$. The values of the shunts $S_1$ and $S_2$ are so chosen in relation to the values of $R_1$ and $R_2$ that a given current through $R_2$ gives the same ammeter reading as a current $$\frac{R_2}{R_1}$$

times as great through the resistance $R_1$. In other words, the full scale current of ammeter A with shunt $S_1$ connected thereacross to provide a first range is $$\frac{R_2}{R_1}$$

times as great as the full scale current of ammeter A with shunt $S_2$ connected thereacross to provide a second range. Thus for a given deflection on ammeter A in the two ranges, the applied currents bear a fixed ratio, resistances $R_1$ and $R_2$ having the inverse ratio to said fixed ratio. Accordingly the resistance of shunt $S_2$ is high with respect to the resistance of shunt $S_1$. The values required of shunts $S_1$ and $S_2$ for the desired ranges may be calculated from the well-known equation $$R_s = \frac{R_m \times I_m}{I - I_m}$$

wherein:

$R_s$ is the shunt resistance in ohms;
$R_m$ is the ammeter resistance in ohms;
$I_m$ is the full scale current of the ammeter;
$I$ is the current desired to be read.

In practice it is convenient to make $R_2$ eleven times the value of $R$. Then if $E$ is the mains voltage and $I_1$, $I_2$ the currents through $R_1$ and $R_2$ it follows that $$I_1 = \frac{E}{R_1 + X}$$

and $$I_2 = \frac{E}{R_2 + r + X}$$

To determine X, the value of $r$ is adjusted to make the ammeter reading the same in both settings of the switch W, i. e.

$$I_1 = \frac{R_2}{R_1} \cdot I_2$$

Substituting for $I_1$ and $I_2$, this gives $$X = \frac{R_1}{R_2 - R_1} \cdot r$$

Thus, if $R_2 = 11 \cdot R_1$ as suggested above $$X = \frac{1}{10} \cdot r$$

Consequently if two decade resistances are used for $r$ having values of 10 to 100 in steps of 10 ohms and 1 to 10 in steps of 1 ohm, a range of from 0.1/10 in steps of 0.1 ohm for X is afforded; the resistances can be standard resistances and can be calibrated at one tenth of their actual values to give a direct reading of the value of X. For use with mains supplying current at a voltage of the order of 200-250 volts, the resistance $R_1$ can conveniently be of the order of 25 ohms.

It is to be understood with regard to the above equations for $I_1$ and $I_2$ that the resistance of ammeter A paralleled by either shunt $S_1$ or $S_2$ is very low relative to its associated circuit so that the connection of the shunted ammeter in series with the circuit in which the current is to be measured does not appreciably alter this current. Therefore, the resistance of a shunted ammeter A may be neglected in the equations without given rise to any material error in the calculation.

Conveniently, the ammeter is provided with a manually set pointer which can be set by the operator to the ammeter pointer when $R_1$ is in circuit, and thereafter with $R_2$ and $r$ in circuit the value of $r$ is adjusted to bring the ammeter pointer into coincidence with the pre-set pointer. The ammeter then need not be provided with a calibrated scale.

Figure 3:
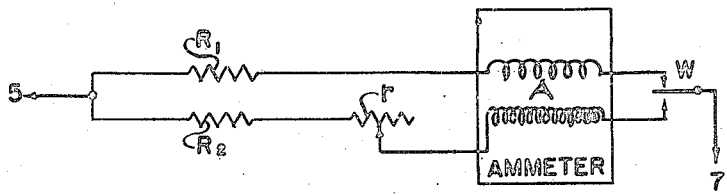
Fig. 3 is a corresponding diagram of a second embodiment.

In the modification of Fig. 3, in which components corresponding to those of Fig. 2 are indicated by the same reference numerals, the ammeter A is in the form of a double wound moving iron instrument in which the ratio of the turns corresponds with the ratio of the shunts $S_1$ and $S_2$ in Fig. 2.

Figure 4:
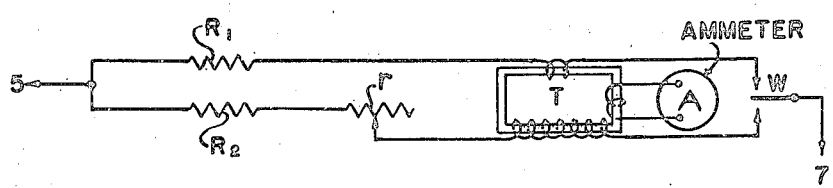
Fig. 4 is a corresponding diagram of a third embodiment.

In the further modification of Fig. 4, the ammeter is connected to one winding of a current transformer having three windings, the other two windings being connected in series with the resistance $R_1$ and the resistances $R_2$ and $r$ respectively. The ratio of these other two windings can readily be made the inverse of the ratio of the values of the resistances $R_1$ and $R_2$, so that for equal currents the deflections are in this ratio.

In the embodiments of both Fig. 3 and Fig. 4 a simple two-way single pole switch is sufficient for the switching operation. Preferably the switch is spring controlled so as normally to be set in the lower current position.

Apart from the features specifically referred to, the embodiments of Figs. 3 and 4 are similar to the embodiment more fully described with reference to Fig. 2, and the measurement procedure and other details are identical in all three cases and thus will not be further described with reference to Figs. 3 and 4.

In the discussion of the measurement procedure with reference to Fig. 2, the resistances of the connecting leads to the points 5 and 7 have been ignored. In practice, the values of the resistances $R_1$ and $R_2$ may differ from the nominal values by an amount appropriate to compensate for the lead resistances.

I claim:

1. Apparatus for measuring the electrical resistance of a circuit having a power source, said apparatus comprising a current indicator having a first current range and a second and more sensitive current range whereby for a given deflection of said current indicator in said first and second range currents applied to said indicator bear a fixed ratio, a first impedance element, a second impedance element of relatively large value with respect to said first element, the values of said first and second impedance elements having an inverse ratio to said fixed ratio, an adjustable impedance element connected in series with said second impedance element, and means including a switch for selectively connecting in a first position said current indicator in said first range across the circuit to be measured in series with the said first impedance element, and in a second position connecting said current indicator in said second range across the circuit to be measured in series with said second impedance element and said adjustable impedance element.

2. Apparatus for measuring the electrical resistance of a circuit having a power source, said apparatus comprising a current indicator having a first current range and a second and more sensitive current range whereby for a given deflection of said current indicator in said first and second range currents applied to said indicator bear a fixed ratio, a first resistance element, a second resistance element of relatively large value with respect to said first element, the values of said first and second resistance element having an inverse ratio to said fixed ratio, an adjustable resistance element connected in series with said second resistance element, and means including a switch for selectively connecting in a first position said current indicator in said first range across the circuit to be measured in series with said first resistance element, and in a second position connecting said current indicator in said second range across the circuit to be measured in series with said second resistance element and said adjustable resistance element.

3. Apparatus for measuring the electrical resistance of a circuit having a power source, said apparatus comprising a current indicator having a first current range and a second and more sensitive current range whereby for a given deflection of said current indicator in said first and second range currents applied to said indicator bear a fixed ratio, a first resistance element, a second resistance element of relatively large value with respect to said first element, the values of said first and second resistance element having an inverse ratio to said fixed ratio, an adjustable resistance element connected in series with said second resistance element, and means including a switch having spring control means for selectively connecting in a first position said current indicator in said first range across the circuit to be measured in series with said first resistance element and in a second position connecting said current indicator in said second range across the circuit to be measured in series with said second resistance element and said adjustable resistance element, said spring control means acting normally to maintain said switch in said second position.

4. Apparatus for measuring the electrical resistance of a circuit having a power source, said apparatus comprising an ammeter, a first shunt for said ammeter to provide a first current range, a second shunt for said ammeter to provide a second and more sensitive current range whereby for a given deflection of said ammeter in said first and second ranges currents applied to said ammeter bear a fixed ratio, a first resistance element, a second resistance element of relatively large value with respect to said first resistance element, the values of said first and second resistance elements having an inverse ratio to said fixed ratio, an adjustable resistance element connected in series with said second resistance element, and means including a switch for selectively connecting in a first position said ammeter across the circuit to be measured in series with said first resistance element and simultaneously connecting said first shunt in parallel with said ammeter, and in a second position connecting said ammeter across the circuit to be measured in series with said second resistance element and said adjustable resistance element and simultaneously connecting said second shunt in parallel with said ammeter.

5. Apparatus for measuring the electrical resistance of a circuit having a power source, said apparatus comprising an ammeter, a first shunt for said ammeter to provide a first current range, a second shunt for said ammeter to provide a second and more sensitive current range whereby for a given deflection on said ammeter in said first and second ranges currents applied to said ammeter bear an 11:1 ratio, a first resistance element, a second resistance element of relatively large value with respect to said first resistance element, the values of said first and second resistance elements having a 1:11 ratio, an adjustable resistance element connected in series with said second resistance element, and means including a switch for selectively connecting in a first position said ammeter across the circuit to be measured in series with said first resistance element and simultaneously connecting said first shunt in parallel with said ammeter, and in a second position connecting said ammeter across the circuit to be measured in series with said second resistance element and said adjustable resistance element and simultaneously connecting said second shunt in parallel with said ammeter.

6. Apparatus for measuring the electrical resistance of a circuit having a power source, said apparatus comprising a double wound ammeter, one winding providing a first current range, the other winding providing a second and more sensitive current range whereby for a given deflection of said ammeter in said first and second ranges currents applied to said ammeter bear a fixed ratio corresponding to the ratio of said windings, a first resistance element, a second resistance element of relatively large value with respect to said first element, the values of said first and second resistance elements having an inverse ratio to said fixed ratio, an adjustable resistance element connected in series with said second resistance element, and means including a switch for selectively connecting in a first position said one ammeter winding across the circuit to be measured in series with said first resistance element and in a second position connecting said other ammeter winding across the circuit to be measured in series with said second resistance element and said adjustable resistance element.

7. Apparatus for measuring the electrical resistance of a circuit having a power source, said apparatus comprising an ammeter, a current transformer having two primary windings and a secondary winding, said secondary winding being connected to said ammeter, one primary winding providing a first current range for said ammeter, the other primary winding providing a second and more sensitive current range for said ammeter whereby for a given deflection on said ammeter in said first and second ranges currents applied to said two primary windings bear a fixed ratio corresponding to the ratio of said two primary windings, a first resistance element, a second resistance element of relatively large value with respect to said first element, the values of said first and second resistor having an inverse ratio to said fixed ratio, an adjustable resistance element connected in series with said second resistance element, and means including a switch for selectively connecting in a first position said one primary winding across the circuit to be measured in series with said first resistance element, and in a second position connecting said other primary winding across the circuit to be measured in series with said second resistance element and said adjustable resistance element.

HENRY GEORGE TAYLOR.

REFERENCES CITED

The following references are of record in the file of this patent:

UNITED STATES PATENTS

| Number | Name | Date |
|---|---|---|
| 1,997,164 | Zuschlag | Apr. 9, 1935 |

OTHER REFERENCES

Kempe, Handbook of Electrical Testing, 5th ed., 1892; Span & Chamberlain, New York, pages 126–135.